United States Patent [19]

Bagley et al.

[11] Patent Number: 4,835,057

[45] Date of Patent: May 30, 1989

[54] GLASS FIBERS HAVING ORGANOSILSESQUIOXANE COATINGS AND CLADDINGS

[75] Inventors: Brian G. Bagley, Watchung Boro; Charles R. Kurkjian, Bernards Township, Somerset County; William E. Quinn, Middlesex Boro, all of N.J.

[73] Assignees: Bell Communications Research, Inc., Livingston; AT&T-Bell Laboratories, Murray Hill, both of N.J.

[21] Appl. No.: 29,995

[22] Filed: Mar. 25, 1987

[51] Int. Cl.[4] .................... B32B 27/06; G02B 6/00
[52] U.S. Cl. .................... 428/391; 428/447; 428/429; 350/96.34; 350/96.30; 350/96.23
[58] Field of Search ............ 428/391, 447, 429; 350/96.34, 96.30, 96.23

[56] References Cited

U.S. PATENT DOCUMENTS 4,733,942  3/1988  Hida et al. ..................... 428/391

FOREIGN PATENT DOCUMENTS 0034247  3/1979  Japan ..................... 428/391
1052616  3/1986  Japan ..................... 428/391
1076574  4/1986  Japan ..................... 428/391

OTHER PUBLICATIONS

B. G. Bagley, P. K. Gallagher, W. E. Quinn and L. S. Amos, Materials Research Society Symposium, Proc. vol. 32 (7/1984), Elsevier Science Publishing Co., Inc., pp. 287-292.

*Primary Examiner*—George F. Lesmes
*Assistant Examiner*—A. Harbin
*Attorney, Agent, or Firm*—James W. Falk; Edward M. Fink

[57] ABSTRACT

A silica fiber coated with an organosilsesquioxane polymer guide light and evidences excellent mechanical integrity under adverse conditions of temperature and humidity. The polymer serves as a suitable coating and cladding for silica-based fibers designed for low fabrication cost fiber optic applications, as a replacement for plastic coatings on silica-based fibers, and as a water barrier for fiber applications in humid environments. The polymeric material described evidences characteristics which are superior for both polymeric coatings (acrylate) and claddings (linear siloxanes).

2 Claims, 1 Drawing Sheet

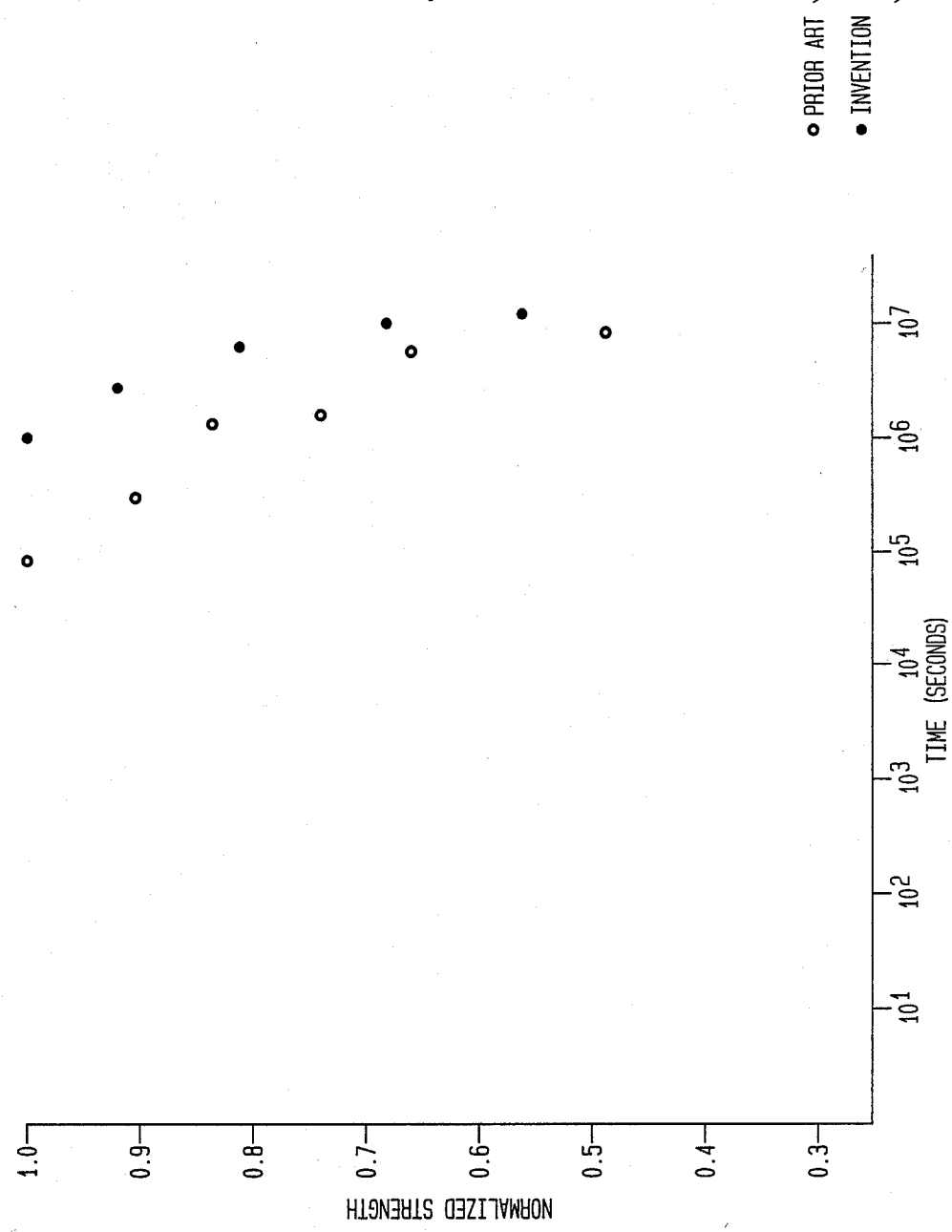

GLASS FIBERS HAVING ORGANOSILSESQUIOXANE COATINGS AND CLADDINGS

BACKGROUND OF THE INVENTION

This invention relates to glass fibers having a coating and/or cladding. More particularly, the present invention relates to glass fibers having a thin layer of an organosilsesquioxane polymer which serves as a coating and/or cladding.

During the past decade, considerable interest has been generated in the use of glass fibers for fiber optic applications. In these applications, it is essential that the fiber selected guide light and evidence mechanical integrity, even under adverse temperature and humidity conditions. Thus, as an example, high cost single mode silica-based fibers commonly employed in under sea cables have a silica-based cladding and require a water barrier to protect the fiber from the adverse effects of humidity. Heretofore, workers in the art have attempted to attain this end by the use of an acrylate coating which is applied to the fiber. The prime disadvantage encountered with this material resides in the fact that the coating loses its protective attributes under high temperature and high humidity conditions, for example, at 90° C. and 90% humidity. Efforts to obviate this limitation focused upon the use of silicon nitride or silicon carbide coatings. These materials did not suffer from the temperature humidity limitations of the acrylates; however, they are known to be very brittle. Accordingly, cracking can be commonly encountered, so exposing the underlying fiber with a cracked coating to moisture and/or elevated temperatures which leads to degradation of fiber characteristics. Thus, the search has continued for suitable coatings for silica-based fibers which maintain strength characteristics at elevated temperatures and humidity. There is a similar need for the mechanical protection of silica-based fibers to be used in applications in which strength is the primary design criterion, including their use in high-strength composites.

To be useful as a fiber cladding, a material must have an appropriately lower index of refraction with respect to the fiber core so as to guide light within the core. In those cases in which the cladding is applied to the fiber core an additional requirement is that the cladding material have good adhesive characteristics. One current difficulty is that much of present day fiber optics technology, including the availability of low cost light sources and detectors, depends on a silica-based material for the light-guiding fiber core and the number of ways to produce a cladding with an index less than that of $SiO_2$ is quite limited. They include fluorine doped silica, an expensive process used in demanding applications (e.g. undersea fiber optic cables) and the organic or linear siloxane polymers used in the less stringent plastic-coated-silica applications. There is, however, a need for low cost applied claddings with good adhesive qualities and an appropriate lower index of refraction as compared to silica for fiber optic applications in demanding environments which exceed the capabilities of the organic or linear siloxanes.

SUMMARY OF THE INVENTION

In accordance with the present invention, this end has been attained by the use of an organosilsesquioxane polymer in the coating/cladding on the fiber. The resultant coating/cladding is more chemically durable, thermally stable and abrasion resistant than the coatings in current use for this purpose.

BRIEF DESCRIPTION OF THE DRAWING

The invention will be more readily understood by reference to the following detailed description taken in conjunction with the accompanying drawing wherein:

The FIGURE is a graphical representation on coordinates of normalized strength versus time in seconds showing the efficiency of the described coating as a water barrier during accelerated aging, strength being measured as a function of time in distilled water at 90° C., and comparing the coating with a conventional epoxy-acrylate prior art coating.

DETAILED DESCRIPTION

The organosilsesquioxane polymer employed in the practice of the present invention is prepared by the hydrolysis and condensation polymerization of substituted silanes. The resultant material is of the formula:

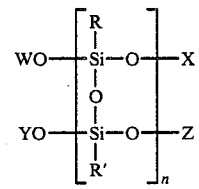

wherein R and R' may be the same and are selected from the group consisting of aliphatic hydrocarbons having from 1–4 carbon atoms, a phenyl radical, phenyl radicals substituted with hydroxyl and halogen groups, and halogen groups, provided R and R' are not both halogens, W, X, Y and Z are selected from the group consisting of alkoxy groups of 1–4 carbon atoms, halogen atoms, hydroxyl and silanol groups, and n is an integer ranging from 10–200.

The term "coating" as employed herein is used to denote a material which provides mechanical protection. The term "cladding" is used to denote a material which will confine light to a fiber core, so providing light guiding capabilities. The invention, as described herein serves in either or both functions.

In the operation of the coating/cladding process, the polymeric material is applied to the fiber of interest as a fluid by heating it to a temperature at which its viscosity ranges from 100–5000 poise, the specific viscosity being dictated by considerations relating to the thickness desired and by curing limitiations. Typically, when using a conventional coating cup, the viscosity of the polymer is desirably 1000 poise.

The fiber which it is desired tó coat may be a conventional silica or silica-based fiber drawn from a rod obtained from commercial sources or from a silica-based preform which has been freshly prepared. Other possible core materials may contain the other chalcogenides (S, Se, Te) or the light and heavy metal halides. The fiber is then passed through a flexible die coating cup containing the polymer solution which adheres to the fiber in a thickness ranging from 5–150 microns. Coatings greater than 150 microns in thickness tend to crack under coating conditions described herein whereas coatings less than 5 microns in thickness fail to produce the desired protective effect.

Following, the coated fiber is drawn through a tube furnace to effect curing a temperature ranging from 150°–400° C. over a time period ranging from 0.5–180 minutes, the shorter time period corresponding with the higher temperature and the converse. The fiber bearing the cured coating/cladding may then be passed into a second coating cup, if desired, for application of an organic polymer coating which reduces microbending optical losses.

In an alternative technique, the desired viscosity of the organosilsesquioxane polymer is obtained by means of an organic solvent rather than by heating. Typical solvents suitable for this purpose are mixtures of alcohols and acetates such as ethanol/ethyl acetate and butanol/butyl acetate mixtures or organic alcohols such as methyl, ethyl and butyl alcohol.

Studies of the coated fibers prepared in the foregoing manner reveal that the fiber is easily handled and not fragile; the tensile strength measured in air and the dynamic fatigue constant (N) determined at 65% relative humidity and 25° C. are comparable with mechanically protected fibers. However, as noted previously, chemical durability, thermal stability and abrasion resistance are superior to prior art coatings.

An example of the practice of the present invention is set forth below. It will be understood by those skilled in the art that the exemplary embodiment is solely for the purposes for exposition and is not to be construed as limiting. It will be further understood that coatings may contain dyes or fillers whose role is incidental to the invention.

EXAMPLE

A 2.5 centimeter diameter silica rod, which was neither acid etched nor fire polished, was drawn by conventional drawing techniques to a diameter of 120 μm. Then, the drawn fiber was passed through a cone-shaped flexible die coating cup containing an organosilsesquioxane polymer that is available commercially and is prepared by hydrolysis and condensation polymerization of methyltriethoxysilane, the polymer being of the formula:

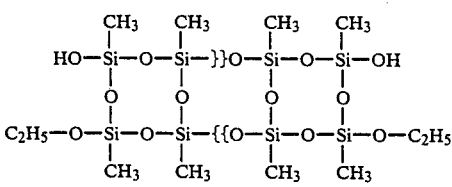

The organosilicon polymer solution was prepared by dissolving the solid resin in ethyl acetate and adjusting the viscosity to 10 poise. The fiber exiting from the coating cup had a coating of 12 μm in thickness. Following, the coated fiber was drawn, in-line, through a 2 cm. diameter, 25 centimeter long curing furnace at a temperature of 500° C. the draw speed of 20 meters per minute being dictated by the need to achieve the appropriate polymer cure in the in line furnace. Higher draw speeds obviously require longer furnaces and/or subsequent thermal treatments. The refractive index profile (n) of the coated fiber was obtained with a commercial automatic fiber characterization system, and strength and fatigue measurements were made in bending. The observed index depression was 0.04 and therefore appropriate as a cladding for guiding light in a silica-based fiber. The five second tensile strength measured in air at 65% relative humidity and 25° C. was 765 Ksi. The dynamic fatigue constant (N) determined under the same ambient conditions was 29. These results show that the described material provides excellent mechanical protection and is, therefore an effective coating. The efficacy of the material as a water barrier was evaluated by accelerated aging wherein the strength was measured as a function of time in distilled water at 90° C. with tests being run concurrently at the same conditions using a conventional prior art epoxy-acrylate coated silica fiber. The results of such testing are shown in the Figure.

With reference now to the Figure, there is shown on coordinates of normalized strength against time in seconds comparing the efficiency of an epoxy-acrylate prior art coating with the coating of the invention as a water barrier in distilled water at 90° C. The prior art coating is designated by a circle (o) and the coating of the invention by a period (.).

It should be noted that the onset of the marked loss in strength (the arc of the curve) in the coating of the invention corresponds with an extension in time by an order of magnitude over that of the epoxy-acrylate. In other terms, it may be concluded that the onset of catastrophic loss in strength occurs in the epoxy acrylate coating after one day whereas catastrophic loss with the coating of the invention occurs after more than one week. The term "coating" as employed herein is used to denote a material which provides mechanical protection. The term "cladding" is used to denote a material which will confine light to a fiber core, so providing light guiding capabilities. The effects of temperature and humidity on the linear siloxanes are similar to those of the acrylates.

While the invention has been described in detail in the foregoing specification, it will be understood that such is not limiting and modifications within the skill of the art may be made. Thus, the processing of the organosilicon polymer is compatible with other coating materials so that a desired combination of properties may be achieved with multiple coatings.

Furthermore, the described coatings may have application to other non-fiber glass products for the purpose of enhancing mechanical strength.

What is claimed is:

1. Glass structure having light guiding and cable capability comprising a glass having a thin coating of all organosilsesquioxane polymer of the formula:

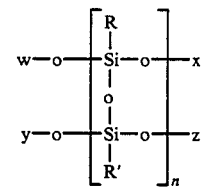

wherein R and R' may be the same and are selected from the group consisting of
   (a) aliphatic hydrocarbons of 1–4 carbon atoms
   (b) a phenyl radical
   (c) a phenyl radical substituted with hydroxy or halogen groups, and
   (d) halogen groups, provided R and R' are not both halogens.

w, x, y and z are functional groups selected from the group consisting of alkoxy groups of 1–4 carbon atoms, halogen atoms, hydroxyl groups and silanol groups, and n is an integer ranging from 10–200.

2. Structure in accordance with claim 1 wherein the glass is a fiber.

* * * * *